UNITED STATES PATENT OFFICE.

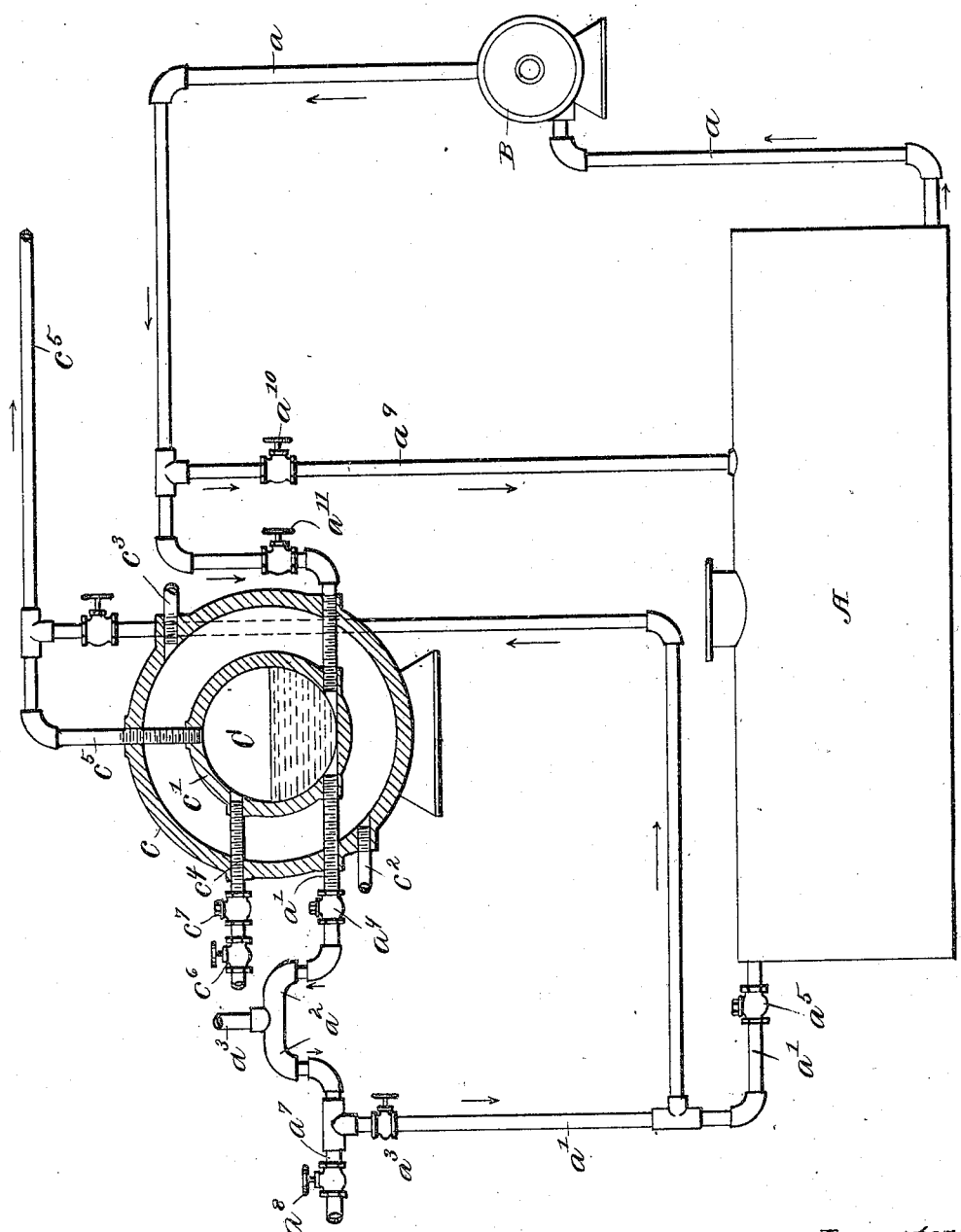

FRANK H. BATES, OF ELYRIA, OHIO, ASSIGNOR, BY MESNE ASSIGNMENTS, TO POWER PLANT ENGINEERING CO., A CORPORATION OF PENNSYLVANIA.

GENERATING OIL-GAS FOR EXPLOSIVE-ENGINES.

1,046,539. Specification of Letters Patent. Patented Dec. 10, 1912.

Application filed June 22, 1908, Serial No. 439,727. Renewed May 4, 1912. Serial No. 695,313.

*To all whom it may concern:*

Be it known that I, FRANK H. BATES, a citizen of the United States, resident of Elyria, county of Lorain, and State of Ohio, have invented a new and useful Improvement in Generating Oil-Gas for Explosive-Engines, of which the following is a specification, the principle of the invention being herein explained and the best mode in which I have contemplated applying that principle, so as to distinguish it from other inventions.

My invention relates to the art of vapor or gas generation for use in connection with explosive engines.

It concerns conditions affecting the formation of the gas or vapor. In this art the common practice is to generate an oil gas from a liquid hydrocarbon, by means of heat, generally supplied, for the sake of economy, by the exhaust gases from the engine, said gas, either alone, or in a mixture with air, being supplied to the engine. While I do not confine myself to this heating medium, nor to the generation of the gas from a particular liquid hydrocarbon, (for my invention, in some of its phases, is independent of these restrictions) I shall herein describe and illustrate my process in connection with the common practice above stated, that is, supplying the heat to the generator by the exhaust gases from the engine, and using any hydrocarbon, particularly kerosenes, heavy distillates and crude oils from which to generate the gas or vapor. In the prior practice, the generators of this art are adapted to contain the oil, either as a definite body, the level of which is maintained constant, or to receive it as a flowing body passing through a tortuous course within it, in a more or less attenuated stream. In all cases however the oil expelled from the generator is in the form of a waste residue (having been cooked so as to as nearly as possible expel all useful vapors) and is not again passed through the generator. An example of the first practice will be found in Letters Patent of the United States Nos. 748,687, and 763,039, granted to me January 5th, 1904, and June 21st, 1904, respectively, while the second practice is illustrated by Letters Patent of the United States No. 746,914, granted to me December 15th, 1903. My invention is equally applicable, in most of its aspects, to both forms of generators, but I describe my present process in connection with a generator employing a definite constant level oil body.

The object of my present invention, primarily, is to bring about such conditions in connection with the generation of gas or vapor in a generator, as will tend toward the production of a gas or vapor in sufficiently constant quantity and quality to permit of close regulation at the engine.

It is recognized that there is a difficulty in maintaining close regulation of explosive engines in connection with the use of a liquid fuel, as instanced in the case of gasolene being sprayed directly into the cylinder, or indirectly, as when a liquid fuel is passed into a generator to be there converted into a gas or vapor. My present invention tends to lessen this difficulty by providing a gas at a more or less constant rate and quality. This is accomplished by maintaining a circulation of oil through the generator, rapid enough to prevent noticeable impoverishment. It can be readily understood, that, with a generator in which a body of oil is held at a constant level, and in which the loss by vaporization is made up by the additions of the inflowing fresh oil, a gradual impoverishment takes place, due to the accumulation of residual matter, which with an oil of asphaltic base is largely asphalt. With a given temperature therefore, the gas or vapor becomes weaker and is given off more slowly in exact proportion to this impoverishment. With a machine of just sufficient size to produce gas in quantity to handle a given load at the engine, the rapid impoverishment necessitates frequent and prompt additions and subtractions of heat by hand to maintain the rate of vaporization with a fluctuating quality of the oil body. It might be stated in this connection that an explosive engine generally furnishes more than sufficient heat, in its exhaust or spent gases, to properly vaporize most oils. This frequent changing of temperature conditions, however, cannot be made in a delicate enough manner to prevent changes in the quality of the gas which affects the regulation of the explosive engine, necessitating thereby frequent changes of the valves governing the admission of gas and air, which for certain classes of service is impractical, since such nicety of the operation is impossible.

By the present invention, in which the oil is caused to flow through the generator, at a rate sufficient to prevent appreciable impoverishment, at the time, and for reasons of economy back to the oil storage tank, which latter can be made of size to hold many hours' supply, the impoverishment must take place in the entire oil system consisting of generator, piping and oil storage tank. The impoverishment in this latter case takes place so slowly that it can be entirely overcome by a very gradual addition of heat, this avoidance of sudden changes, permitting of the maintenance of a good mixture of gas and air at the engine and thereby affording better regulation. Since in generators of the type described both pure oil gas or vapor and oil gas or vapor admixed with air at the generator, are used, according to conditions, it must be understood that hereafter in claiming the features of my invention I refer to and imply gas or vapor, whether alone or mixed with air as a carrier.

To the accomplishment of the above and related objects, said invention then consists of the steps and embodies the means hereinafter fully described and particularly pointed out in the claims.

The annexed drawing and the following description set forth in detail certain mechanism and modes of operation exemplifying the invention, such disclosed means constituting, however, but one of several ways in which the principle of the invention may be used.

In said annexed drawing the single figure there appearing represents in more or less diagrammatic fashion the general layout of a plant for producing gas from oil, embodying my several improvements.

In such drawing A represents an oil storage tank which may be of any convenient size, the location thereof with respect to the rest of the apparatus being a matter of indifference. From such storage tank the oil is designed to be raised through a supply line $a$ to a gas generator C by means of a pump B. Generator C, which as previously indicated is of the receptacle type adapted to contain a definite body of oil, comprises an outer shell $c$ and an inner shell $c'$, the former affording between its inner sides and the outer sides of the inner shell a passage for the heating medium and the latter providing the receptacle proper for the oil to be vaporized. Pipes $c^2$ $c^3$ respectively serve to conduct the heated waste gases from the engine to the generator and away therefrom, while another pipe $c^4$ is provided for the admission to the generator of air when this is desired either to dilute the vapors arising from the body of oil therein or to serve as a vehicle or carrier for the same, while a fourth pipe $c^5$ serves to conduct such vapors to the explosive engine. Air inlet pipe $c^4$ is suitably controlled by a globe valve $c^6$ for regulating the amount of air passing therethrough and a check valve $c^7$ that is adapted to prevent any back-flow of vapors from the generator.

The generating chamber or receptacle, in addition to being connected with reservoir supply line $a$ is provided with a discharge line $a'$ leading to reservoir A so that a constant circulation of oil through the generator may be maintained by means of pump B. The desired level of oil in such chamber is secured by forming a loop $a^2$ in the discharge line as shown, such loop being provided with an air vent $a^3$ to prevent siphonic action. Discharge or return line $a'$ is furthermore connected to the gas suction line $c^5$, which leads to the gas intake at the engine, whereby the pressure within such pipe line $a'$ and the vaporizing chamber of the generator are equalized. This is desirable for the reason that the pressure in line $c^5$, and hence in the generator, is liable, under certain working conditions, to be lower than atmospheric. A stop valve $a^3$ and check valves $a^4$ $a^5$ in line $a'$ respectively serve to regulate the flow of oil therethrough and to prevent any return of oil from the reservoir. The equalization of pressure secured in the manner just described will enable the oil to flow freely toward the lower check valve $a^5$ until a sufficient amount of oil has accumulated to open the same and allow passage into the tank A. Venting is provided in connection with the latter so as to maintain atmospheric pressure therein; hence, once started the return flow into the oil storage tank will be continuous. A branch $a^7$ is connected with the discharge line just beyond loop $a^2$ and provided with a stop valve $a^8$ for the purpose of testing the flow in such line if desired. The supply line $a$ is also provided with a branch $a^9$ having a stop valve $a^{10}$ therein and leading directly to storage tank A whereby not only may the oil supplied through the pipe be in part diverted to the tank without passing through the generator at all, but also the proper back pressure be secured to effect a uniform and proper operation of the stop valve $a^{11}$ in the portion of the supply line between such branch and the generator whereby the amount of oil admitted to the generator is regulated.

The method of oil-gas generation exemplified in the operation of my apparatus should be fairly apparent from the preceding description of the construction of the same. Thus, a sufficient body of oil being segregated in tank A, pump B is started running and by adjustment of valves $a^{10}$ $a^{11}$ a constant circulation of desired volume maintained through the generator C. While the rate of flow thus secured may be varied, it should be at least enough to maintain at all times the level of the oil in such chamber at the predetermined maximum limit prescribed by the loop $a^2$ in the outflow or discharge pipe $a'$. In this way the vaporizing action of the generator will remain uniform. Such flow furthermore is designed to be sufficiently rapid to prevent impoverishment of the oil by any other than imperceptible degrees. As a result the general body of oil maintained in tank A is only gradually impoverished and the oil at any time found in the generator chamber will be of substantially equal richness to that found in the said tank. In view of the previous explanation of the operation of engines with gas derived in the manner in hand, it will be obvious that a very close regulation of the engine can be had in consequence of the above gradual change in the character of the vapor supplied thereto instead of the frequent and periodic changes involved in methods heretofore prevailing. As the oil slowly becomes more and more impoverished the temperature of the vaporizing chamber is raised to maintain the gas output, but there will be no rapid fluctuations in the quality of the latter owing to the infrequency of such changes, and for this same reason proper adjustment of the air supply either through air-inlet $c^4$, or at the engine, may be had to maintain the maximum efficiency of the latter.

Other modes of applying the principle of my invention may be employed instead of the one explained, change being made as regards the process and apparatus herein disclosed, provided the steps or means stated by any of the following claims or the equivalent of such stated steps or means be employed.

I therefore particularly point out and distinctly claim as my invention:—

1. The method of producing gas from oil, which consists in segregating a body of the oil, gradually transferring oil from such body to a vapor generator of the receptacle type, and returning to said body any excess of oil over that required to maintain a predetermined level of oil in said generator, the rate of transfer from such body to said generator being at least such as to preserve such predetermined level in the latter.

2. The method of producing gas from oil, which consists in segregating a body of the oil, gradually transferring oil from such body to a vapor generator of the receptacle type, and returning to said body any excess of oil over that required to maintain a predetermined level of oil in said generator, the rate of transfer from such body to said generator being in excess of that required to preserve such predetermined level in the latter.

3. The method of producing gas from oil, which consists in segregating a body of the oil, gradually transferring oil from such body to a vapor generator of the receptacle type, and returning to said body any excess of oil over that required to maintain a predetermined level of oil in said generator, the rate of transfer from such body to said generator being considerably in excess of that of vapor generation, whereby such predetermined level is preserved and usch body of oil impoverished by imperceptible degrees.

Signed by me this 19th day of June, 1908.

FRANK H. BATES.

Attested by—
  E. R. RODD,
  JNO. F. OBERLIN.

---

Copies of this patent may be obtained for five cents each, by addressing the "Commissioner of Patents, Washington, D. C."